United States Patent
Fertell et al.

(10) Patent No.: US 6,978,304 B2
(45) Date of Patent: Dec. 20, 2005

(54) METHOD OF REMOTELY MONITORING AN INTERNET SESSION

(75) Inventors: David A. Fertell, Chester Springs, PA (US); Joseph I. Field, Jr., Herndon, VA (US)

(73) Assignee: Pearl Software, Inc., Exton, PA (US)

( * ) Notice: Subject to any disclaimer, the term of this patent is extended or adjusted under 35 U.S.C. 154(b) by 803 days.

(21) Appl. No.: 09/866,212

(22) Filed: May 25, 2001

(65) Prior Publication Data

US 2002/0032770 A1   Mar. 14, 2002

Related U.S. Application Data

(60) Provisional application No. 60/207,380, filed on May 26, 2000.

(51) Int. Cl.[7] .......................................... G06F 15/173
(52) U.S. Cl. ..................... 709/224; 709/217; 709/218; 709/224; 709/227
(58) Field of Search ............................. 709/227, 200, 709/203, 204, 217–219, 228, 249, 224

(56) References Cited

U.S. PATENT DOCUMENTS

| | | | | |
|---|---|---|---|---|
| 5,577,254 A | * | 11/1996 | Gilbert ..................... 707/104.1 |
| 5,809,250 A | * | 9/1998 | Kisor .......................... 709/227 |
| 5,907,547 A | * | 5/1999 | Foladare et al. ............ 370/352 |
| 6,011,909 A | * | 1/2000 | Newlin et al. ............... 709/227 |
| 6,023,507 A | * | 2/2000 | Wookey ...................... 709/224 |
| 6,076,100 A | * | 6/2000 | Cottrille et al. ............. 709/219 |
| 6,195,679 B1 | * | 2/2001 | Bauersfeld et al. ......... 709/224 |
| 6,286,030 B1 | * | 9/2001 | Wenig et al. ................ 709/203 |
| 6,336,133 B1 | * | 1/2002 | Morris et al. ............... 709/218 |
| 6,397,256 B1 | * | 5/2002 | Chan et al. .................. 709/224 |
| 6,470,075 B1 | * | 10/2002 | Prieur ........................... 379/38 |
| 6,470,390 B1 | * | 10/2002 | Westfield ..................... 709/227 |
| 6,535,909 B1 | * | 3/2003 | Rust ............................. 709/204 |
| 6,606,644 B1 | * | 8/2003 | Ford et al. ................... 709/203 |
| 6,631,412 B1 | * | 10/2003 | Glasser et al. .............. 709/224 |
| 6,658,466 B1 | * | 12/2003 | Ellestad et al. .............. 709/224 |
| 6,694,008 B1 | * | 2/2004 | Mukherji et al. ........... 379/228 |
| 6,754,312 B1 | * | 6/2004 | Gundlach .................... 709/224 |

* cited by examiner

*Primary Examiner*—Ario Etienne
*Assistant Examiner*—Ramy Osman
(74) *Attorney, Agent, or Firm*—The Webb Law Firm

(57) ABSTRACT

A method of remotely monitoring an Internet session includes participating in a first Internet session at a first Internet protocol (IP) address. Concurrent with the first Internet session, another Internet session is initiated at another IP address. Data associated with the first Internet session is automatically transferred to the other IP address via the other Internet session.

19 Claims, 2 Drawing Sheets

METHOD OF REMOTELY MONITORING AN INTERNET SESSION

CROSS-REFERENCE TO RELATED APPLICATIONS

This application claims priority from U.S. Provisional Patent Application Ser. No. 60/207,380, filed May 26, 2000, and entitled "Internet Monitoring Method".

BACKGROUND OF THE INVENTION

1. Field of the Invention

The present invention relates to monitoring of data associated with an Internet session, especially an Internet chat session.

2. Description of the Prior Art

It is an unfortunate byproduct of Internet chat sessions that online predators are able to easily make contact with other members of the chat session, one or more of whom may become a target of a personal threat to their personal security and/or safety. It is this possibility of advances by online predators that represents one of the primary risks to adoption of the Internet at home or in the classroom. Currently, there exists no easy or suitable way for a potential victim to respond to threats and/or to assist investigators in the apprehension of online predators.

It is, therefore, an object of the present invention to provide a method for capturing the content of an ongoing Internet communication and mirror the communication to a monitoring computer for display and/or storage. Still other objects of the invention will become apparent to those of ordinary skill in the art upon reading and understanding the following detailed description.

SUMMARY OF THE INVENTION

Accordingly, we have invented a method of remotely monitoring an exchange of data between a local computer and a remote computer during an Internet session over the Internet. In the method, a local computer stores an Internet server address and a port number of a monitor computer. A first Internet session is initiated between the local computer and a remote computer by the Internet. The local computer stores data associated with the first Internet session. At an appropriate time, the local computer retrieves the stored Internet server address and port number. Thereafter, the first computer initiates a second Internet session, concurrent with the first Internet session, with the monitor computer at the retrieved Internet server address and port number. The monitor computer transmits at least one of another Internet server address and another port number to the local computer. After terminating the second Internet session, the local computer initiates a third Internet session, concurrent with the first Internet session, with the monitor computer at the other Internet server address and/or the other port number. The local computer transfers the stored data associated with the first Internet session to the monitor computer via the third Internet session.

The step of storing data associated with the first Internet session includes storing the data associated with the first Internet session in a memory of the local computer. The step of transferring the stored data includes transferring the data stored in the memory to the monitor computer.

The monitor computer can display on a display thereof the transferred data associated with the first Internet session. The monitor computer can also store the transferred stored data associated with the first Internet session. The data associated with the first Internet session can include data previously displayed on the display of the local computer. Moreover, the local computer can transfer in real-time to the monitor computer via the third Internet session, data displayed on a display of the local computer and associated with the first Internet session.

Preferably, the local computer determines a first check sum of the stored data and transfers the first check sum with the stored data. The monitor computer then determines a second check sum of the transferred stored data. In response to detecting a match between the first and second check sums, the monitor computer displays on a display of the monitor computer the transferred stored data and/or stores the transferred stored data. The local computer can also time-stamp the stored data and transfer the time-stamp with the stored data to the monitor computer for storage.

We have also invented a method of remotely monitoring an Internet session. The method includes participating in a first Internet session at first Internet protocol (IP) address. Concurrent with the first Internet session, another Internet session at another IP address is initiated and data associated with the first Internet session is transferred to the other IP address via the other Internet session.

The step of initiating another Internet session can include initiating a second Internet session at a second IP address and receiving from the second IP address via the second Internet session a third IP address. The second Internet session can be terminated and a third Internet session can be initiated at the third IP address.

The step of transferring data can include the step of transferring data associated with the first Internet session to the third IP address via the third Internet session.

The data associated with the first Internet session can include data previously displayed in connection with the first Internet session and/or data displayed in real-time in connection with the first Internet session. The data transferred to the other IP address via the other Internet session can be displayed and/or stored. At a suitable time the transfer of data to the other Internet session can be terminated and the other Internet session can be terminated.

Lastly, we have invented a method of remotely monitoring an Internet session. The method includes receiving at a second IP address via a second Internet session therewith a request to monitor a first Internet session occurring at a first IP address. A third IP address can be transmitted from the second IP address via the second Internet session and a third Internet session can be initiated at the third IP address. Data associated with the first Internet session is transferred to the third IP address via the third Internet session.

Each IP address includes a unique server address and/or a unique port number.

DETAILED DESCRIPTION OF THE PREFERRED EMBODIMENTS

Figure 1:
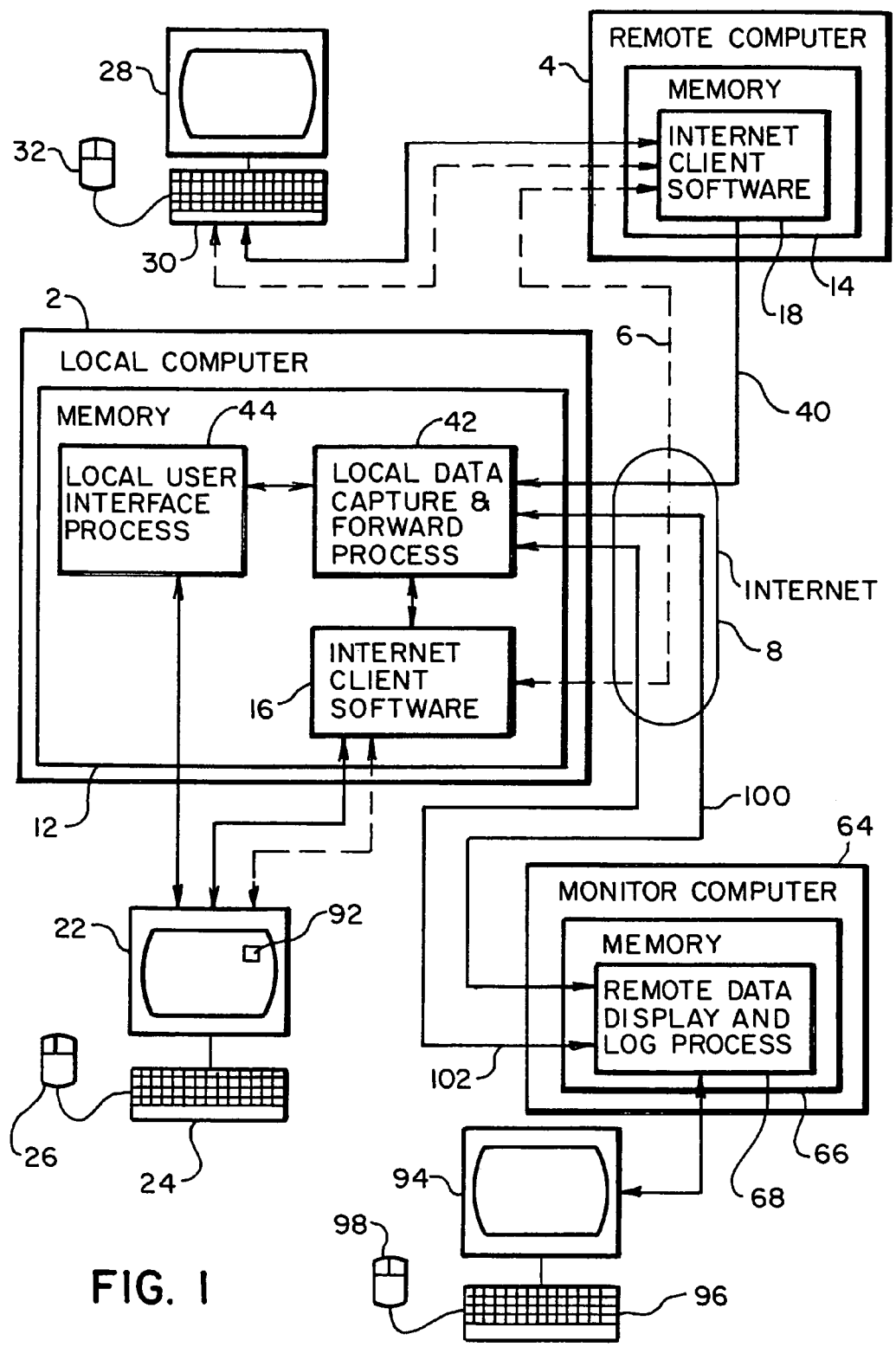
FIG. 1 is a block diagram of hardware utilized to implement a method in accordance with the present invention.

With reference to FIG. 1, a typical prior art Internet chat session includes a user of a local computer 2 corresponding with a user of a remote computer 4 via an Internet session 6 via the Internet 8. As would be apparent to one of ordinary skill in the art, Internet 8 includes one or more servers (not shown) and/or one or more routers (not shown) that facilitate the chat session between local computer 2 and remote computer 4. Local computer 2 and remote computer 4 include memory 12 and memory 14 for storing client software 16 and client software 18, respectively. Client software 16 and client software 18 control the operation of local computer 2 and remote computer 4, respectively, to enable the users thereof to communicate during the chat session via Internet session 6.

More specifically, client software 16 receives data from remote computer 4 via Internet session 6 and displays all or part of this received data on a display 22 connected to local computer 2. In addition, client software 16 receives data from a user of local computer 2 via a keyboard 24 and/or a mouse 26 coupled to local computer 2. Client software 16 displays all or part of this user data on display 22 and/or transmits all or part of this data to remote computer 4 via Internet session 6.

In a manner similar to client software 16 of local computer 2, client software 18 of remote computer 4 causes all or part of data received from local computer 2 via Internet session 6 to be displayed on a display 28 of remote computer 4. In addition, client software 18 receives data input by a user of remote computer 4 via a keyboard 30 and/or a mouse 32 coupled to remote computer 4. Client software 18 causes all or part of this user data to be displayed on display 28 and/or transmitted to local computer 2 via Internet session 6.

In response to local computer 2 receiving data from remote computer 4, client software 16 causes all or part of this data to be displayed on display 22. Similarly, in response to remote computer 4 receiving data from local computer 2, client software 18 causes all or part of this data to be displayed on display 28. Thus, as can be seen, local computer 2 and remote computer 4 enable users thereof to correspond via Internet session 6 over Internet 8.

Unfortunately, it has been well documented that an Internet chat session is a means by which an online predator can initiate unwanted solicitations and advances, especially with minor children. It is this lack of personal security and safety that represents a primary risk to adoption of the Internet in the home or in the classroom. In accordance with the present invention, a method for a participant in an Internet chat session to respond to threats and/or assist investigators in the apprehension of potential on-line predators will be described with ongoing reference to FIG. 1.

In accordance with the present invention, a user of local computer 2 communicates with a user of remote computer 4 via a first Internet session 40 utilizing Internet 8. In contrast to Internet session 6 between client software 16 and client software 18, client software 16 of local computer 2 communicates with first Internet session 40 via a local data capture and forward process 42 stored in memory 12. Local data capture and forward process 42 is inserted into the path between client software 16 and first Internet session 40 by a local user interface process 44 stored in memory 12. Local user interface process 44 controls local data capture and forward process 42 to be in a standby mode or in a capture and forward mode.

Figure 2:
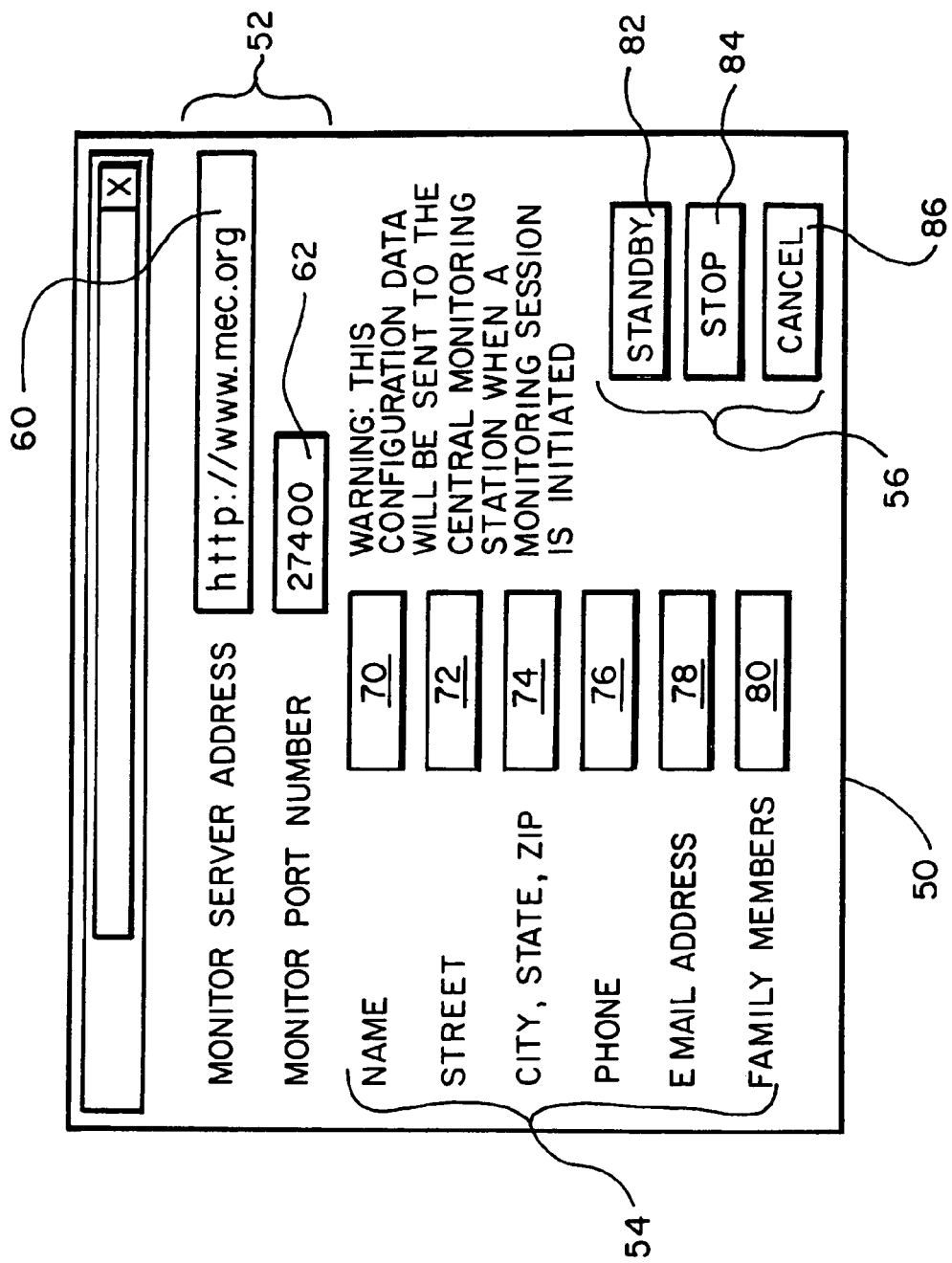
FIG. 2 is a diagram of a dialog box for receiving an Internet protocol (IP) address and/or user information data utilized with the method of the present invention.

With reference to FIG. 2, and with continuing reference to FIG. 1, in operation, in response to activation or starting of local user interface process 44 by a user of local computer 2, local user interface process 44 causes a dialog box 50 to be displayed on display 22. This dialog box 50 includes an Internet protocol (IP) address section 52, a user information section 54 and a push button section 56. IP address section 52 includes a monitor server address field 60 and a monitor port number field 62 for receiving the server address and port number, respectively, of a monitor computer 64. Monitor computer 64 and its function will be described in greater detail hereinafter.

User information section 54 preferably includes name field 70; street field 72; a combined city, state, zip field 74; a phone number field 76; an e-mail address field 78; and a family members field 80. Push button section 56 preferably includes a standby button 82, a stop button 84 and a cancel button 86.

In use, a user of local computer 2 enters the server address and/or port number of monitor computer 64 into fields 60 and 62, respectively, and enters data into fields 70–80 of user information section 54. Next, the user of local computer 2 selects standby button 82 or stop button 84. In response to selecting either of these buttons, local user interface process 42 stores the data in IP address section 52 and user information section 54 in memory 12 of local computer 2. In response to the user of local computer 2 selecting cancel button 86, local user interface process 44 erases the data received in the various fields of IP address section 52 and user information section 54, and does not store any of the erased data in memory 12.

When standby button 82 is activated, local user interface process 44 attempts to establish an interprocess communication link with local data capture and forward process 42. If local data capture and forward process 42 is already active, local user interface process 44 establishes communication with local data capture and forward process 42 and an appropriate notification is caused to be displayed on display 22 of local computer 2. Alternatively, if no communication can be established, local user interface process 44 starts or "spawns" local data capture and forward process 42 and configures an operating system (not shown) of local computer 2 to start local data capture and forward process 42 each time local computer 2 restarts.

When standby button 82 is activated, local data capture and forward process 42 enters a standby mode wherein local data capture and forward process 42 causes a persistent emergency button icon 92 to be displayed on display 22 of local computer 2. Emergency button icon 92 can be activated by a user of local computer 2 at anytime the user feels the content of the data associated with first Internet session 40 should be sent to monitor computer 64.

When stop button 84 is activated, local user interface process 44 attempts to establish an interprocess communication link with local data capture and forward process 42. If communication can be established, local user interface process 44 sends a "stop" command through the interprocess communication link to local data capture and forward process 42. In response to receiving the "stop" command, local data capture and forward process 42 terminates and causes the emergency button icon 92 to not be displayed on display 22. In addition, local user interface process 44 will also configure the operating system to not start local data capture and forward process 42 when local computer 2 restarts.

Monitor computer 64 includes a memory 66 which stores a remote data display and log process 68. Connected to monitor computer 64 in a manner known in the art are a display 94, a keyboard 96, and a mouse 98 which collectively act as an interface between monitor computer 64 and a user thereof.

In operation, local data capture and forward process 42 is placed in standby mode during an Internet chat session between a user of local computer 2 and a user of remote computer 4 connected via Internet 8 and first Internet session 40 at a first IP address. If during this chat session, the user of local computer 2 activates the emergency button icon 92 on display 22, local data capture and forward process 42 initiates a second Internet session 100 with monitor computer 64 at a second IP address of Internet 8. This second IP address is the IP address which is entered into fields 60 and 62 of dialog box 50 and which is stored in memory 12. More specifically, in response to the user of local computer 2 activating emergency button icon 92, local data capture and forward process 42 retrieves this second IP address from memory 12 and initiates second Internet session 100 at the second IP address concurrent with first Internet session 40.

In response to initiation of second Internet session 100, remote data display and log process 68 transmits to local data capture and forward process 42 via second Internet session 100 a third IP address. Upon receiving this third IP address, local data capture and forward process 42 terminates second Internet session 100 and initiates a third Internet session 102 with remote data display and log process 68 via monitor computer 64 connected to Internet 8 at the third IP address.

When third Internet session 102 is initiated and running concurrent with first Internet session 40, local data capture and forward process 42 forwards all or part of the data associated with first Internet session 40 to remote data display and log process 68. More specifically, prior to activation of emergency button icon 92, local computer 2 stores all or part of the data associated with first Internet session 40 in a first-in first-out buffer (not shown) of memory 12. When third Internet session 102 is initiated, a copy of the data stored in this buffer is transmitted to remote data display and log process 68 via third Internet session 102. Thereafter, a copy of all or part of the subsequent data associated with first Internet session 40 is transmitted to remote data display and log process 68 via third Internet session 102.

Preferably, only data that is displayed on display 22 of local computer 2 or display 28 of remote computer 4 is transmitted by local data capture and forward process 42 to remote data display and log process 68. This avoids remote data display and log process 68 from receiving data, such as formatting data, unrelated to the monitoring and storage function performed by remote data display and log process 68. Preferably, the data transmitted to remote data display and log process 68 from local data capture and forward process 42 includes a date-stamp and/or a check sum. In a manner known in the art, the remote data display and log process 68 determines another check sum for the data received from local data capture and forward process 42 and determines if the two check sums match. In response to detecting a match between the check sums, the remote data display and log process 68 causes the transferred data to be displayed on display 94 and/or stored in memory 66 of monitor computer 64. Preferably, if the check sums do not match, an error message is generated on display 94 of monitor computer 64 to indicate that the integrity of the transferred data is corrupted. The check sum transferred with the data and the time-stamp are stored with the transferred data in memory 66.

Remote data display and log process 68 preferably causes data received from local data capture and forward process 42 via third Internet session 102 to be displayed on display 94 and stored in memory 66 of monitor computer 64. However, remote data display and log process 68 can store the received data in memory 66 without displaying the data on display 94, or can display the received data on display 94 without storing the data in memory 66.

Remote data display and log process 68 is configured so that data received from local data capture and forward process 42 can be retrieved and displayed on display 94 of monitor computer 64 at a subsequent time.

At a suitable time after the emergency button icon 92 is activated, the user of local computer 2 can cause dialog box 50 to be displayed on display 22. Thereafter, by selecting either standby button 82 or stop button 84, the user can cause local data capture and forward process 42 to re-enter the standby mode or to terminate and cause the emergency button icon 92 to be removed from display 22.

Based on the foregoing, it can be seen that the present invention enables data associated with an Internet chat session to be displayed and/or stored at a remote computer, which is preferably accessible or under the control of law enforcement personnel to aid in investigation of threats by online predators. To assist law enforcement personnel to investigate potential threats, the data transmitted to remote data display and log process 68 by local data capture and forward process 42 preferably includes the first IP address of remote computer 4. This first IP address aids law enforcement personnel in determining the physical location of remote computer 4.

Preferably, monitor computer 64 includes a single port connected at the second IP address and a plurality of ports connected at a like plurality of third IP addresses. Each request received by remote data display and log process 68 via the second IP address causes remote data display and log process 68 to transmit to the requesting local data capture and forward process 42 one of the unused third IP addresses for use by the local data capture and forward process 42 to transmit data to remote data display and log process 68. By having a plurality of unique third IP addresses, monitor computer 64 can receive at the second IP address, a plurality of requests for remote data display and log process 68 to display and/or store data and can assign each request to be processed by remote data display and log process 68 at a unique third IP address of monitor computer 64. In this manner, monitor computer 64 can process multiple requests for data display and/or storage from a plurality of different local data capture and forward processes 42.

In an alternate embodiment, local data capture and forward process 42 forwards all or part of the data associated with first Internet session 40 to remote data display and log process 68 via second Internet session 100. Because all or part of the data associated with first Internet session 40 is forwarded via second Internet session 100, remote data display and log process 68 does not need to store or transmit the third IP address to local data capture and forward process 42 for use in initiating third Internet session 102, and third Internet session 102 is not initialized or utilized.

In this alternate embodiment, remote data display and log process 68 preferably causes data received from local data capture and forward process 42 via second Internet session 100 to be displayed on display 94 and stored in memory 66 of monitor computer 64. However, remote data display and log process 68 can store the received data in memory 66 without displaying the data on display 94, or can display the received data on display 94 without storing the data in memory 66.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. A method of remotely monitoring an exchange of data between a local computer and a remote computer during an Internet session over the Internet, the method comprising the steps of:

(a) storing at a local computer an Internet server address and port number of a monitor computer;

(b) initiating a first Internet session between the local computer and a remote computer via the Internet;

(c) storing at the local computer data associated with the first Internet session;

(d) retrieving the Internet server address and port number stored at the local computer;

(e) initiating concurrent with the first Internet session a second Internet session between the local computer and the monitor computer at the retrieved Internet server address and port number;

(f) transmitting from the monitor computer to the local computer at least one of another Internet server address and another port number;

(g) terminating the second Internet session;

(h) initiating concurrent with the first Internet session a third Internet session between the local computer and the monitor computer using the other Internet server address and/or the other port number; and (i) transferring from the local computer to the monitor computer via the third Internet session the stored data associated with the first Internet session.

2. The method as set forth in claim 1, wherein:

step (c) includes storing the data associated with the first Internet session in a memory of the local computer; and step (i) includes transferring the data stored in the memory to the monitor computer.

3. The method as set forth in claim 1, further including at least one of the steps of:

displaying on a display of the monitor computer the transferred stored data associated with the first Internet session; and storing at the monitor computer the transferred stored data associated with the first Internet session.

4. The method as set forth in claim 1, wherein the data associated with the first Internet session includes data previously displayed on a display of the local computer.

5. The method as set forth in claim 4, further including the step of:

(j) transferring from the local computer to the monitor computer in real-time via the third Internet session data displayed on a display of the local computer and associated with the first Internet session.

6. The method as set forth in claim 5, further including the steps of:

causing the local computer to terminate real-time transferring of data to the monitor computer via the third Internet session; and terminating the third Internet session.

7. The method as set forth in claim 1, wherein:

the local computer determines a first check sum of the stored data and transfers the first check sum with the stored data;

the monitor computer determines a second check sum of the transferred stored data; and in response to detecting a match between the first and second check sums, the monitor computer displays on a display of the monitor computer the transferred stored data and/or stores the transferred stored data.

8. The method as set forth in claim 1, wherein:

the local computer transfers with the transferred stored data the time the stored data is transferred to the monitor computer; and the monitor computer stores with the transferred stored data the time the stored data is transferred to the monitor computer.

9. A method of remotely monitoring an Internet session, the method comprising the steps of:

(a) participating in a first Internet session at a first Internet protocol (IP) address;

(b) concurrent with the first Internet session, initiating another Internet session at another IP address; and (c) transferring data associated with the first Internet session to the other IP address via the other Internet session, wherein steps (a), (b) and (c) are performed at the same user computer, wherein step (b) includes the steps of:

initiating a second Internet session at a second IP address;

receiving from the second IP address via the second Internet session a third IP address;

terminating the second Internet session; and initiating a third Internet session at the third IP address.

10. The method as set forth in claim 9, wherein step (c) includes the step of transferring data associated with the first Internet session to the third IP address via the third Internet session.

11. The method as set forth in claim 9, wherein the data associated with the other Internet session includes at least one of (i) data previously displayed in connection with the first Internet session and (ii) data displayed in real-time in connection with the first Internet session.

12. The method as set forth in claim 9, further including at least one of the steps of:

displaying the transferred data; and storing the transferred data.

13. The method as set forth in claim 9, further including the steps of:

terminating the transfer of the data to the other Internet session; and terminating the other Internet session.

14. The method as set forth in claim 9, further including the steps of:

applying a time-stamp to the data associated with the first Internet session; and transferring the time-stamp to the other IP address via the other Internet session with the data associated with the first Internet session.

15. A method of remotely monitoring an Internet session, the method comprising the steps of:

(a) receiving at a second Internet protocol (IP) address via a second Internet session therewith a request to monitor a first Internet session occurring at a first IP address;

(b) transmitting from the second IP address via the second Internet session a third IP address;

(c) initiating a third Internet session at the third IP address; and (d) transferring data associated with the first Internet session to the third IP address via the third Internet session, wherein:

the first Internet session is between a local user computer and a remote user computer residing at the first IP address;

the second Internet session is between the local user computer and a monitor computer residing at the second IP address; and the third Internet session is between the local user computer and a computer residing at the third IP address.

16. The method as set forth in claim 15, wherein the data associated with the first Internet session includes at least one of (i) data previously displayed in connection with the first Internet session and (ii) data displayed in real-time in connection with the first Internet session.

17. The method as set forth in claim 15, further including at least one of the steps of:
   displaying the transferred data; and
   storing the transferred data.

18. The method as set forth in claim 15, wherein each IP address includes at least one of a unique server address and unique a port number.

19. The method as set forth in claim 15, wherein the computer residing at the third IP address is the monitor computer.

* * * * *